Patented Nov. 14, 1933

1,934,725

UNITED STATES PATENT OFFICE 1,934,725

PROCESS OF GEL FORMATION AND COMPOSITION OBTAINED

James W. McBain, Stanford University, Calif., assignor, by mesne assignments, to S. Sternau & Company, Inc., New York, N. Y., a corporation of New York No Drawing. Application February 20, 1928
Serial No. 255,863

4 Claims. (Cl. 44—7)

The invention relates to a process of gel formation and to the composition obtained thereby, more particularly to organogels, and includes correlated improvements and discoveries whereby the manufacture of such gels and their useful properties are enhanced.

An object of the invention is to provide a process whereby organogels, i. e., gels having an organic liquid as the dispersion medium may be readily and economically prepared and thus be of commercial importance.

A further object of the invention is to provide an organogel of sufficient stability to withstand handling and transportation.

Another object of the invention is to provide a gel comprising combustible constituents having marked heating value, and well adapted for utilization as a fuel, and a process for its manufacture.

Other objects of the invention will in part be obvious and will in part appear hereinafter.

The invention accordingly comprises the process and the several steps thereof, and the product possessing the features, properties, and the relation of constituents, which are exemplified in the following detailed disclosure, and the scope of the application of which will be indicated in the claims.

In accordance with the invention, gel formation is brought about by dissolving a dispersed substance, otherwise called the disperse phase, in an alcohol at a sub-zero temperature on the centigrade scale to form a sol and then causing gellation of the colloidal system by increasing the temperature, either by irradiation from the surrounding atmosphere or by direct application of a heating medium, to a temperature which may be about normal atmospheric temperature.

The dispersed substance or disperse phase may be a nitrocellulose which is insoluble in the dispersion medium at ordinary temperatures, and which may be of a desired degree of nitration either relatively high or relatively low. The dispersion medium may be a combustible liquid such as an alcoholic liquid, for example ethyl alcohol, which I have found to give very satisfactory results when used in the anhydrous form.

The low temperatures at which the process is carried out may be attained by the use of various refrigerating agents, such as a mixture of solid carbon dioxide and ether, anhydrous ammonia, liquid air, compression and expansion of a hydrocarbon gas, of carbon dioxide, of sulphur dioxide, etc., it being often required that a temperature of around —30 to —60 degrees C. be attained in order to accomplish the solution or formation of the sol condition in the system.

As an illustrative embodiment of a manner in which the invention may be practiced, the following example is given:

3 parts of a nitrocellulose having a nitrogen content of 12 per cent, are placed in 100 parts of anhydrous ethyl alcohol and the temperature lowered to a sub-zero temperature by surrounding the containing vessel with a mixture of solid carbon dioxide and ether. The mixture is then agitated in order to accelerate the conditions of solution. When the nitrocellulose has been dissolved or dispersed, the temperature is then caused to increase by removing the solution from the refrigerating bath and either allowing it to warm up under ordinary atmospheric conditions to atmospheric temperature or by applying heat thereto from a suitable heating medium, thereby accelerating the rate at which the temperature is increased and the normal atmospheric temperature condition reached. The mixture, as its temperature rises, gradually sets to a firm, stiff gel.

The gels formed in accordance with the invention have as the disperse phase or structure supporting the gel a nitrocellulose which is insoluble in the dispersion medium at ordinary temperatures, and as the dispersion medium or that which is caused to appear as a solid because of the disperse phase, an alcoholic medium.

The amount of the dispersed substance controls the character of the gel, i. e. with a low percentage or concentration of the dispersed substance, the gel will be weak and without firmness, but as the percentage of the dispersed substance is increased, the firmness of the gel will increase as will also its stability. Gels having from 2½ to 5 per cent. are sufficiently firm and stable to withstand usual handling during manufacture and such transportation as may be required for their commercial distribution.

Gels which are formed from a combustible organic liquid, for example anhydrous alcohol, and a combustible dispersed substance, for example a nitrocellulose, may be used as fuel and are well adapted as such.

Since certain changes in carrying out the above process, and certain modifications in the composition which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described my invention, what I claim as new and desire to secure by Letters Patent is:

1. The process of forming a firm gel, which comprises dissolving at a sub-zero temperature of the general order of −30 to −60° C. in an alcoholic dispersion medium wherein the dispersing agent consists of one or more monohydric alcohols of not more than two carbon atoms, from about 2½% to about 5% of a nitrocellulose which is insoluble therein at ordinary temperatures, and then permitting an increase to normal temperature without evaporation to produce a solid gel adapted for use as a fuel.

2. The process of forming a firm gel, which comprises dissolving at a sub-zero temperature of the general order of −30 to −60 C. in an anhydrous alcoholic dispersion medium wherein the dispersing agent consists of one or more monohydric alcohols of not more than two carbon atoms, from about 2½% to about 5% of a nitrocellulose which is insoluble therein at ordinary temperatures, and then permitting an increase to normal temperature without evaporation to produce a solid gel adapted for use as a fuel.

3. The process of forming a firm gel, which comprises dissolving at a sub-zero temperature of the general order of −30 to −60° C. in ethyl alcohol, from about 2½% to about 5% of a nitrocellulose which is insoluble therein at ordinary temperatures, and then permitting an increase to normal temperature without evaporation to produce a solid gel adapted for use as a fuel.

4. The process of forming a firm gel, which comprises dissolving at a sub-zero temperature of the general order of −30 to −60° C. in anhydrous ethyl alcohol, from about 2½% to about 5% of a nitrocellulose which is insoluble therein at ordinary temperatures, and then permitting an increase to normal temperature without evaporation to produce a solid gel adapted for use as a fuel.

JAMES W. McBAIN.